United States Patent
Cavalotti et al.

(10) Patent No.: US 7,037,404 B2
(45) Date of Patent: May 2, 2006

(54) FALSE DRUM WITH A VARIABLE AREA VACUUM-SURFACE

(75) Inventors: Marie-Laure Bénédicte Josette Cavalotti, Michelbouch (LU); John Kolbjoern Roedseth, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 87 days.

(21) Appl. No.: 10/698,832

(22) Filed: Oct. 31, 2003

(65) Prior Publication Data

US 2004/0089422 A1   May 13, 2004

Related U.S. Application Data

(62) Division of application No. 09/952,635, filed on Sep. 14, 2001, now Pat. No. 6,676,787.

(51) Int. Cl.
*B29D 30/26* (2006.01)
(52) U.S. Cl. .................. 156/405.1; 156/414; 269/21
(58) Field of Classification Search ........... 156/123, 156/133, 110.1, 405.1, 406.2, 406.4, 414; 269/21; 34/115, 453, 635; 209/553; 271/112
See application file for complete search history.

(56) References Cited

U.S. PATENT DOCUMENTS

| | | | |
|---|---|---|---|
| 3,580,790 A | 5/1971 | Pollmeier et al. | |
| 3,616,031 A | 10/1971 | Fleissner | |
| 3,663,012 A | 5/1972 | Van Den Honert | |
| 3,732,767 A | 5/1973 | Habert | |
| 3,752,639 A | 8/1973 | Thagard, Jr. | |
| 3,877,651 A | 4/1975 | Harris | |
| 4,087,177 A | 5/1978 | Gumm et al. | |
| 4,138,307 A | 2/1979 | Rost | |
| 4,145,040 A | 3/1979 | Huber | |
| 4,202,542 A | 5/1980 | Lammers et al. | |
| 4,210,482 A | 7/1980 | Collins | |
| 4,262,715 A | 4/1981 | Hausler et al. | |
| 4,437,659 A | 3/1984 | Caron et al. | |
| 4,445,558 A | 5/1984 | Banner et al. | |
| 4,504,337 A | 3/1985 | Askam et al. | |
| 4,516,451 A | 5/1985 | Takeshita | |
| 4,541,156 A | 9/1985 | Walsh et al. | |
| 4,591,467 A | 5/1986 | Kopernicky | |
| 4,722,255 A | 2/1988 | Choate et al. | |
| 4,724,036 A | 2/1988 | Hill et al. | |
| 4,747,904 A | 5/1988 | Okuyama et al. | |
| 4,767,487 A | 8/1988 | Tomsovic, Jr. | |
| 4,816,105 A | 3/1989 | Yamashita | |

(Continued)

FOREIGN PATENT DOCUMENTS

GB    1010597    11/1965

(Continued)

*Primary Examiner*—Geoffrey L. Knable
(74) *Attorney, Agent, or Firm*—Howard M. Cohn

(57) ABSTRACT

A false drum servers used in the manufacture of tires having a hollow cylindrical drum with a perforated surface on the drum through which air is drawn. The drawn air creating a suction surface for holding flat or sheet materials that are to be cut before transferring onto a tire building drum. When smaller pieces of flat materials are being held on the drum, the perforations that are not covered allow air to flow freely into the drum, thereby reducing the suction adhering effect of the perforated surface. The present invention provides methods and apparatus for varying the amount of perforated area through which air can be drawn into the drum, thereby changing the amount of suction adhering surface area of the perforated drum.

5 Claims, 5 Drawing Sheets

U.S. PATENT DOCUMENTS

| | | |
|---|---|---|
| 4,857,123 A | 8/1989 | Still et al. |
| 4,874,443 A | 10/1989 | Kipling |
| 4,891,082 A | 1/1990 | Broyles et al. |
| 4,925,113 A | 5/1990 | Wissman et al. |
| 5,066,346 A | 11/1991 | Long et al. |
| 5,111,633 A | 5/1992 | Draghetti |
| 5,183,252 A | 2/1993 | Wolber et al. |
| 5,203,942 A | 4/1993 | DeCook et al. |
| 5,273,613 A | 12/1993 | Sato et al. |
| 5,342,068 A | 8/1994 | Large |
| 5,383,001 A | 1/1995 | Bosy |
| 5,635,016 A | 6/1997 | Byerley |
| 5,669,155 A | 9/1997 | Hughes et al. |
| 5,820,726 A | 10/1998 | Yoshida et al. |
| 6,182,957 B1 | 2/2001 | Becker |
| 6,209,867 B1 | 4/2001 | Madsen et al. |
| 6,254,090 B1 | 7/2001 | Rhodes et al. |
| 2003/0051793 A1 | 3/2003 | Cavalotti et al. |

FOREIGN PATENT DOCUMENTS

| | | |
|---|---|---|
| JP | 56023147 | 3/1981 |

FALSE DRUM WITH A VARIABLE AREA VACUUM-SURFACE

CROSS-REFERENCE TO RELATED APPLICATIONS

This is a Divisional application of U.S. application Ser. No. 09/952,635, now U.S. Pat. No. 6,676,787, having a filing date of Sep. 14, 2001 and a common assignee with the present application.

This application relates to U.S. patent application Ser. No. 09/952,536 (Publication No. US-2003-0051793-A1 Published Mar. 20, 2003) having a filing date of Sep. 14, 2001 and a common assignee with the present application.

TECHNICAL FIELD OF THE INVENTION

The invention relates to methods and apparatus used in the preparation of materials to be used in the fabrication of pneumatic tires. In particular the invention relates to the perforated cylindrical drum portion of a "False Drum" server on which elastomeric sheet materials are held while being cut prior to being transferred to a tire building drum.

BACKGROUND OF THE INVENTION

It is known that in making vehicle tires, for example for automobiles, that manufacture of a so-called carcass is first achieved by successively assembling several different components. In other words, the different carcass types included in a production range can be distinguished from one another depending on the presence thereon of the various accessory components and/or the typology of the accessory components themselves. By way of example, when carcasses for tubeless tires are to be produced, that is tires that in use do not require the presence of an inner tube, the main components can be considered to include a so-called inner liner that is a layer of elastomeric air-impervious material, a carcass ply, a pair of annular metal elements, commonly referred to as bead cores, around which the opposite ends of the carcass ply are folded, as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

Certain tire building assembly lines use servers of various kinds for the purpose of securely holding flat materials such as tire innerliner while it is being cut to size. Servers are commonly of the flat conveyor type, such as the one shown in British Patent No. 1,010,597 (Dunlop Rubber Company) or the conveyor and cutting system shown in U.S. Pat. No. 4,722,255 (Choate, et al.), wherein a continuous flat sheet of material is delivered upon a flat conveyor to a cutting knife and then the material is removed to be placed upon the tire being built. Another such conveyor system is taught in U.S. Pat. No. 5,820,726 (Yoshida, et al.), incorporating a "transfer drum" element which feeds material to the conveyor system.

Drum servers, or so called "False Drum" servers, are an alternative conveyor of flat or sheet tire materials that must be held securely while being cut. After being cut, the sheet material is moved to the tire under construction on the building drum. Generally such a False Drum server consists of a horizontally disposed drum or cylinder that is able to rotate about its cylindrical axis. One particular False Drum type server consists of a circular cylindrical drum that is hollow. The surface of the drum is perforated around most of its circumference, and air is pumped out of the drum in sufficient volume that the low pressure within the drum provides a suction adhering surface which can securely hold the flat or sheet materials that are being cut while being held on the server. When a flat sheet of material, such as tire innerliner, is placed on the perforated cylindrical part of the server, the pressure differential between the inside of the drum and the outside causes the flat material to adhere to the drum surface while the material undergoes a cutting operation.

An alternative drum-type server system which also holds flat materials to its cylindrical surface is taught in U.S. Pat. No. 4,504,337 (Askam, et al.) which describes a drum type server system wherein the method by which the flat materials that are held to be cut are held securely by a magnetic surface. Such a system, however, is of course limited in use to flat or sheet tire materials that contain steel or ferromagnetic elements such as wires, cords or metal cloth.

The type of False Drum server described hereinabove, in which air is drawn through a perforated cylindrical surface as a method by which to hold securely the materials being cut, is suitable for use with nonmagnetic sheet of flat material. Also suitable is the vacuum cup method taught in U.S. Pat. No. 4,891,082 (Broyles and Portalupi) wherein "sets of vacuum cups spaced circumferentially" around the circumference of the outer rim of a "transfer roll" which serves essentially the same purpose as the aforementioned False Drum server. The vacuum cups are pumped individually by compressed air motors.

The suction adhering part of the perforated drum type False Drum server is its perforated cylindrical drum surface. The False Drum server has a substantially bigger diameter than the building drum. Sheet rubber components are measured to a required length on the False Drum server, and then are cut before being transferred to the building drum. The elastomeric sheet or flat materials that are placed on the False Drum server are held to the False Drum server because the pressure differential across the perforated cylindrical surface makes the cylindrical surface into a suction adhering surface.

False Drum servers generally have the advantage being faster than traditional conveyor or belt type (flat) servers or roller conveyors in terms of allowing greater speed of cutting of flat sheet materials. A disadvantage of False Drum servers, however, is that for flat components, such as innerliner and ply, the portion of the perforated cylindrical surface that is not covered by the flat material being cut is open to the free flow of air into the drum. Such free flow of air weakens the pressure differential that holds the sheet material to the drum. (Uncovered holes represent "leaks".) One way to deal with this leakage problem is simply to use adhesive tape or other materials to block the flow of air through those portions of the perforated surface that are not covered by the flat sheet material. (In other words—plug the holes.) But since the various pieces of material being cut are often of different sizes from one another, as typically happens when changing from a large tire component to a smaller component, the tape or other air flow blocking material must be removed and replaced so that the low pressure inside the drum can thereby be maintained. (You don't want holes to be plugged where you want the vacuum-suction to hold material.) However, the time required to place tape over the unused portions of the perforated surface area, and remove it later, is undesirable. Another risk of the tape hole-plugging method is contamination of the tire components with pieces of adhesive tape that might work loose and attach themselves to the sticky uncured elastomeric material.

An alternative to the use of tape is to use a massively over-dimensioned air pump to remove air from inside the False Drum. With a sufficiently high capacity air (vacuum) pump, holes (leaks) become a non-problem. However, oversized pumps are not desirable because of energy consumption and environmental considerations as well as overall capital costs and operating costs. Another solution is proposed in the aforementioned U.S. Pat. No. 4,891,082 (Broyles and Portalupi) which discloses the use of individually controllable vacuum pumps for each vacuum cup used to hold sheet materials on a cylindrical surface. This method requires, however, that complex controls be used to control the individual vacuum pumps to achieve both economy of operation and the ability to provide a suction adhering surface having a size that rapidly accommodates flat sheets having different amounts of surface area of specific flat sheet materials being held by suction forces to the cylindrical surface.

What is needed is a technique for controlling the vacuum to the holes in the surface of a False Drum server, without requiring oversized pumps and/or without requiring a plurality of pumps.

SUMMARY OF THE INVENTION

It is an object of the present invention to provide methods and apparatus as defined in one or more of the appended claims and, as such, having the capability of accomplishing one or more of the following subsidiary objects.

According to the invention, method and apparatus are provided for controlling airflow (suction) through (pressure differential across) a plurality of holes (perforations) extending through the outer surface of a cylindrical drum.

According to a one aspect of the invention, two axially movable disc-like baffle plates are provided within the drum, defining a volume therebetween. The baffle plates are axially moveable, and sealingly engage the inner surface of the drum. Their positions determine the effective width (along the axis) of an area of the surface of the drum which will exert suction on a sheet of material laid on the surface of the drum.

According to another aspect of the invention, a circumferentially moveable curved cylinder segment is provided, conforming to the inner surface of the perforated cylindrical drum, and by circumferentially positioning the curved cylinder segment adjacent a portion of the inner surface of the hollow perforated cylindrical drum, the amount of perforated surface area through which air can be drawn into the hollow cylindrical drum can further be controlled.

In this manner, suction can be provided only at selected ones of the perforations which correspond to a desired amount of surface area to be used for holding elastomeric sheet materials on the outer surface of the drum.

An advantage of the present invention is that it provides simplified methods and apparatus by which to control or vary, on the hollow perforated cylindrical drum portion of a False Drum server, the portion of the total perforated surface area through which air can be drawn into the cylindrical drum portion of the False Drum when the entire perforated area is not covered by sheet material being processed.

Another advantage of the present invention is to provide simplified methods and apparatus by which to control or vary, on the perforated drum portion of the False Drum server, the circumferential dimension of the perforated area through which air can be drawn into the perforated drum.

Another advantage of the present invention is to provide simplified methods and apparatus by which to control or vary, on the perforated drum portion of the False Drum server, the axial dimension of the perforated area through which air can be drawn into the perforated drum.

Another advantage of the present invention is to provide simplified methods and apparatus by which to move and otherwise position from outside of the drum various airflow blocking devices placed inside the hollow cylindrical drum.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
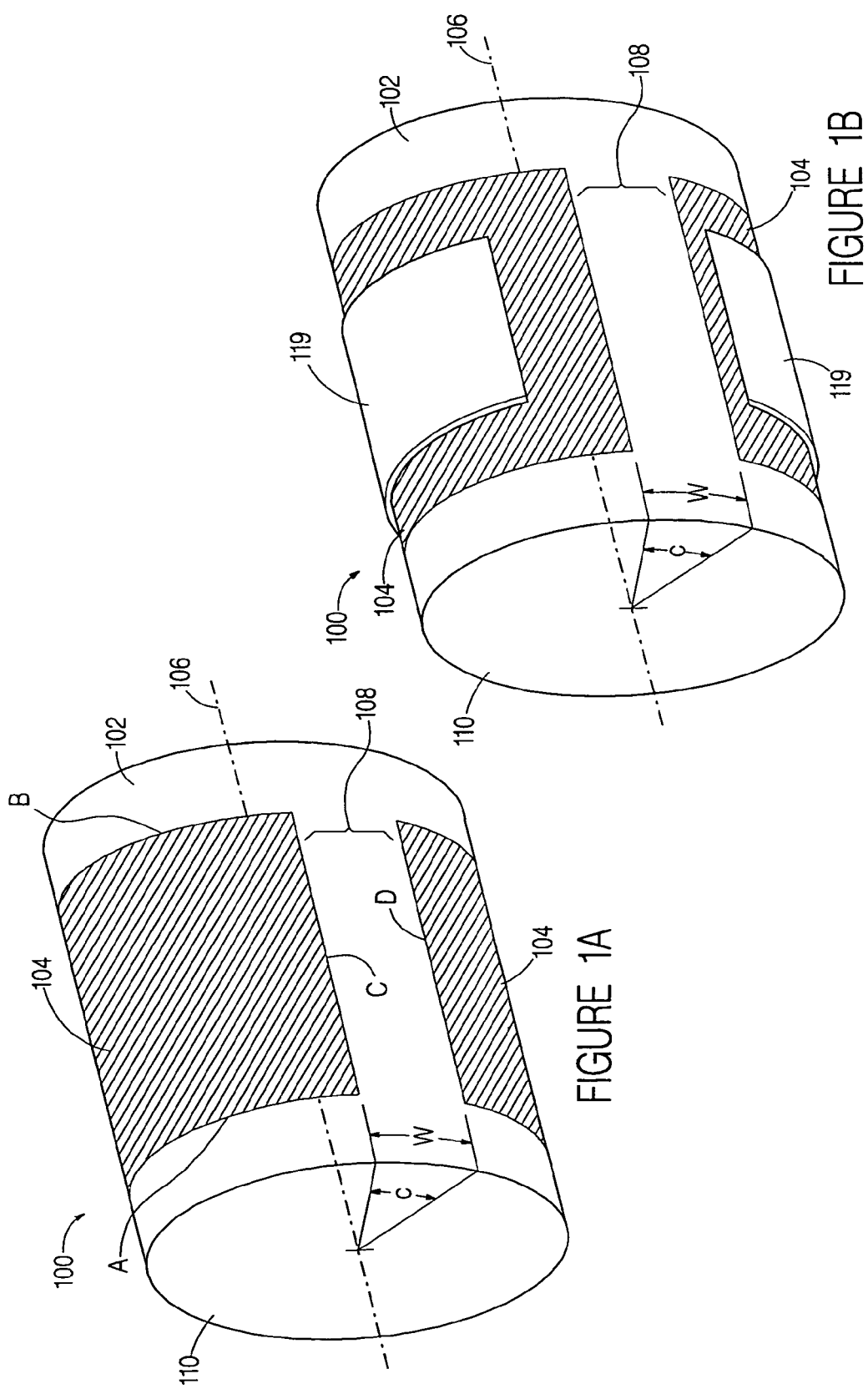
Figure 2:
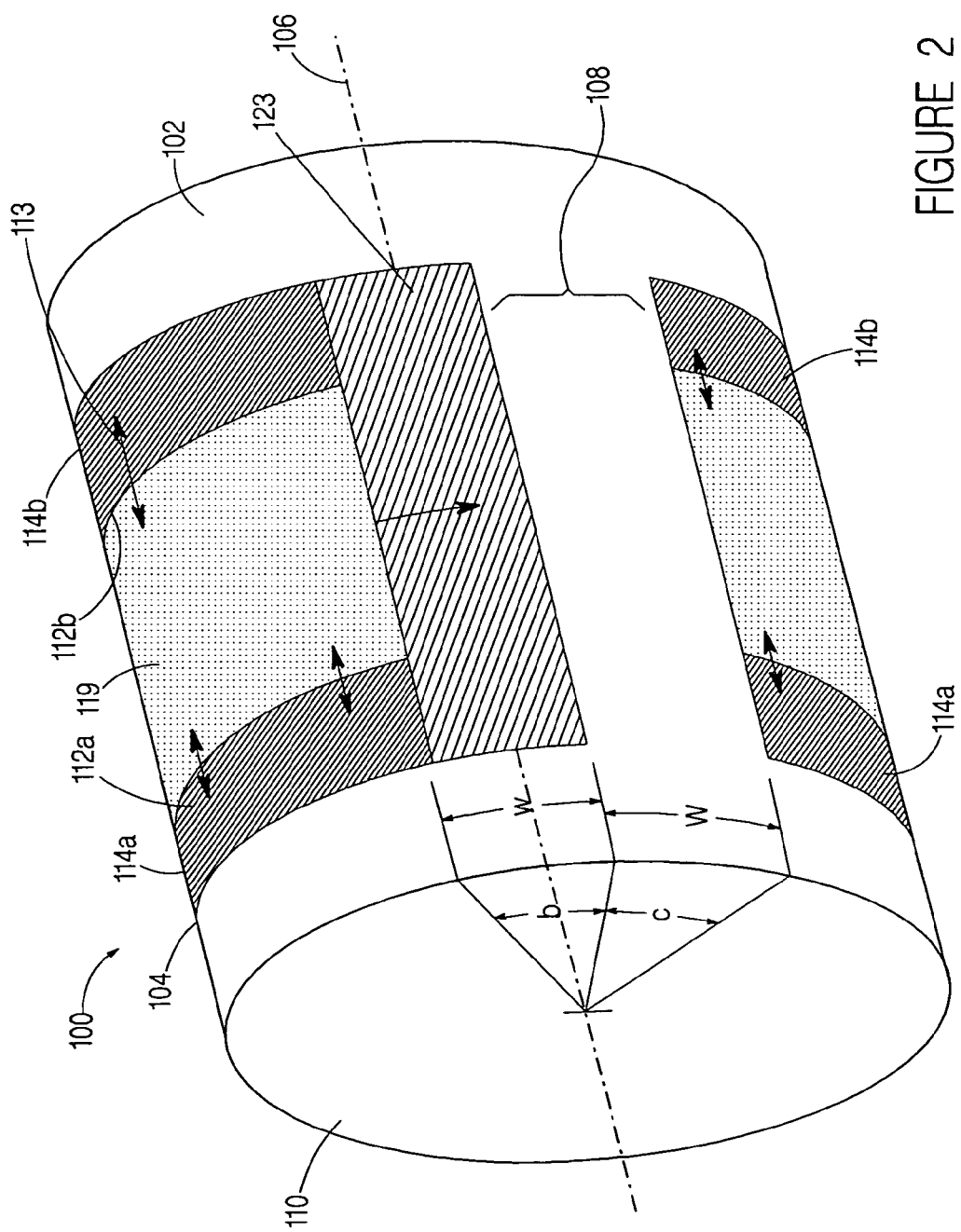
Figure 3:
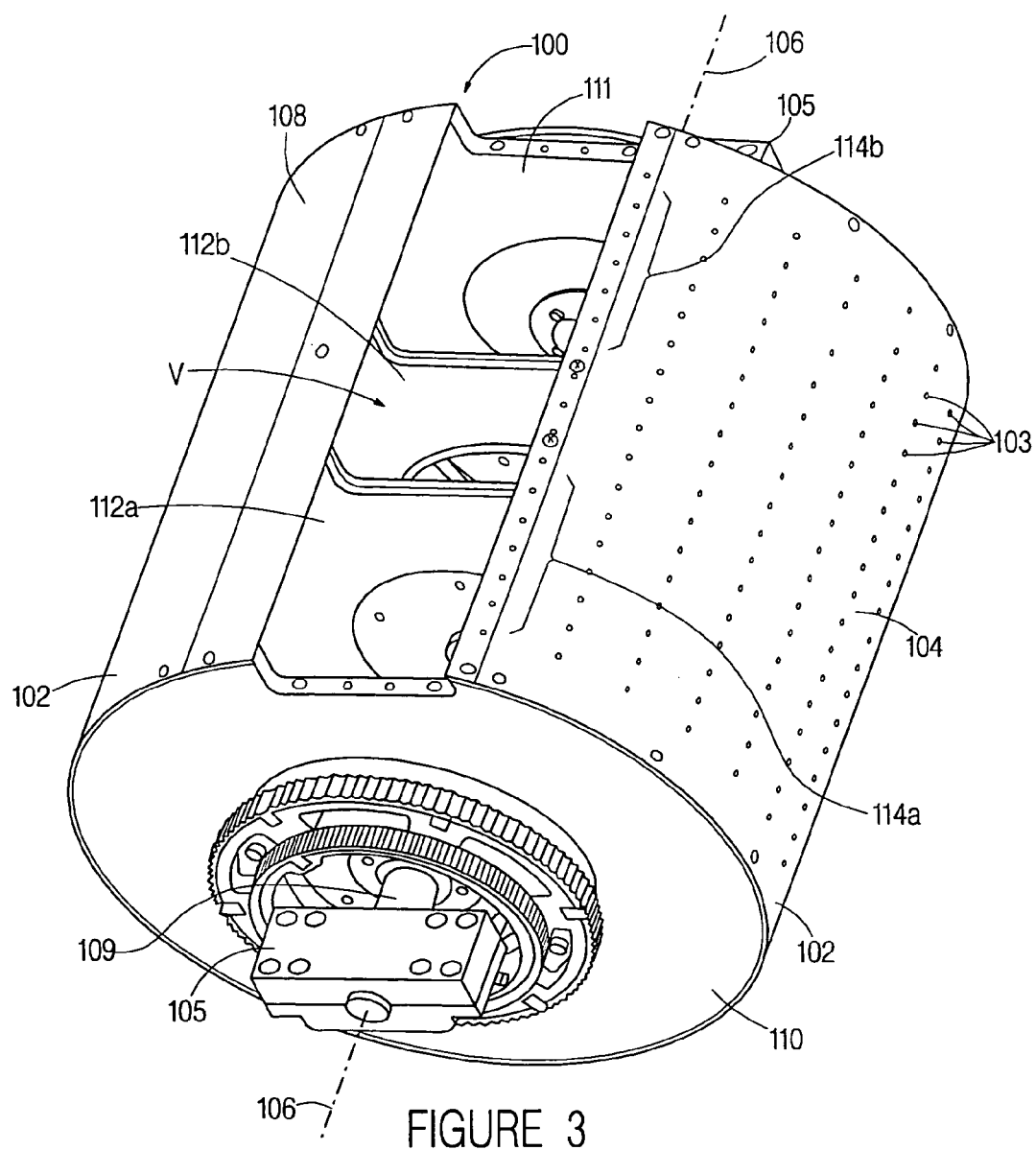
Figure 4:
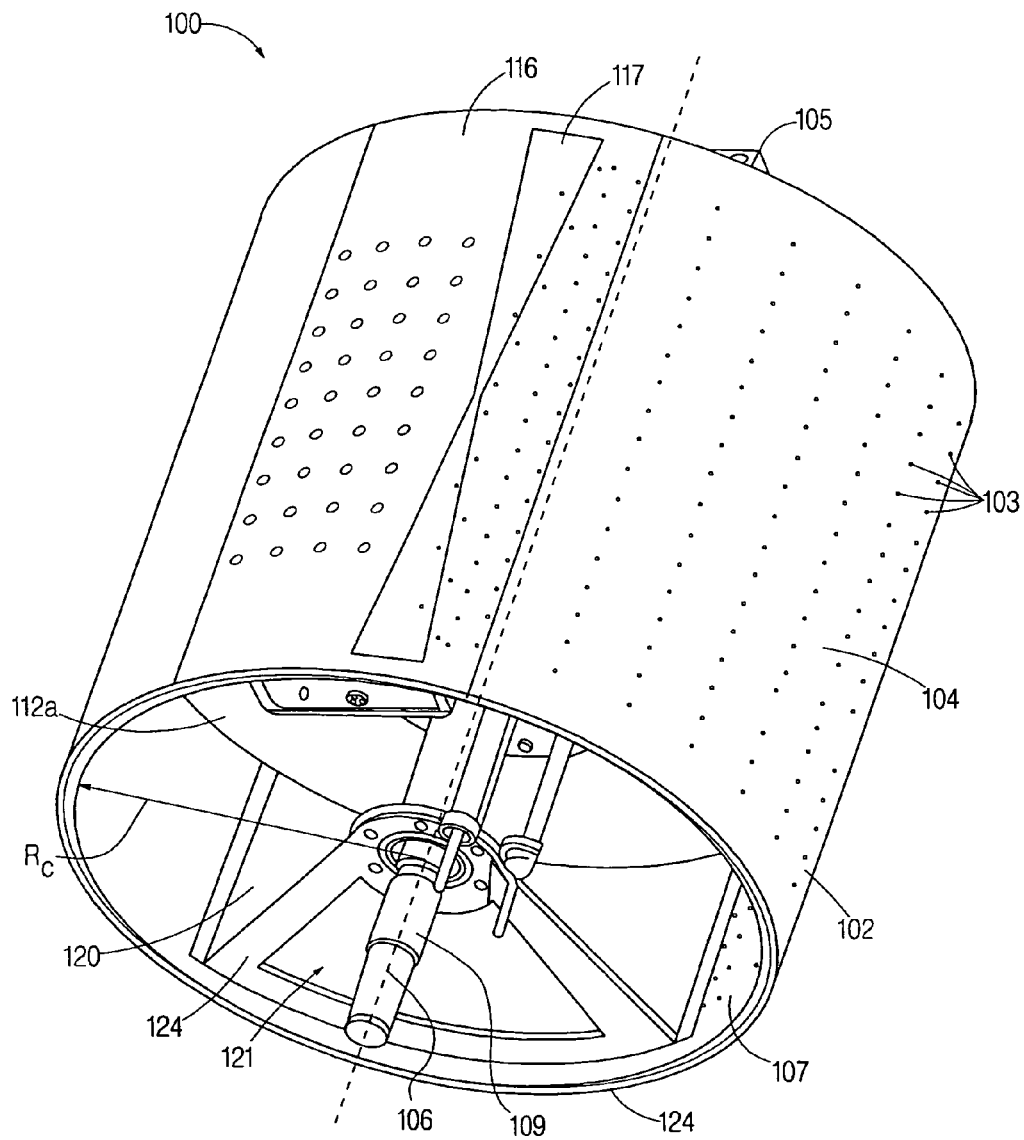
Figure 5:
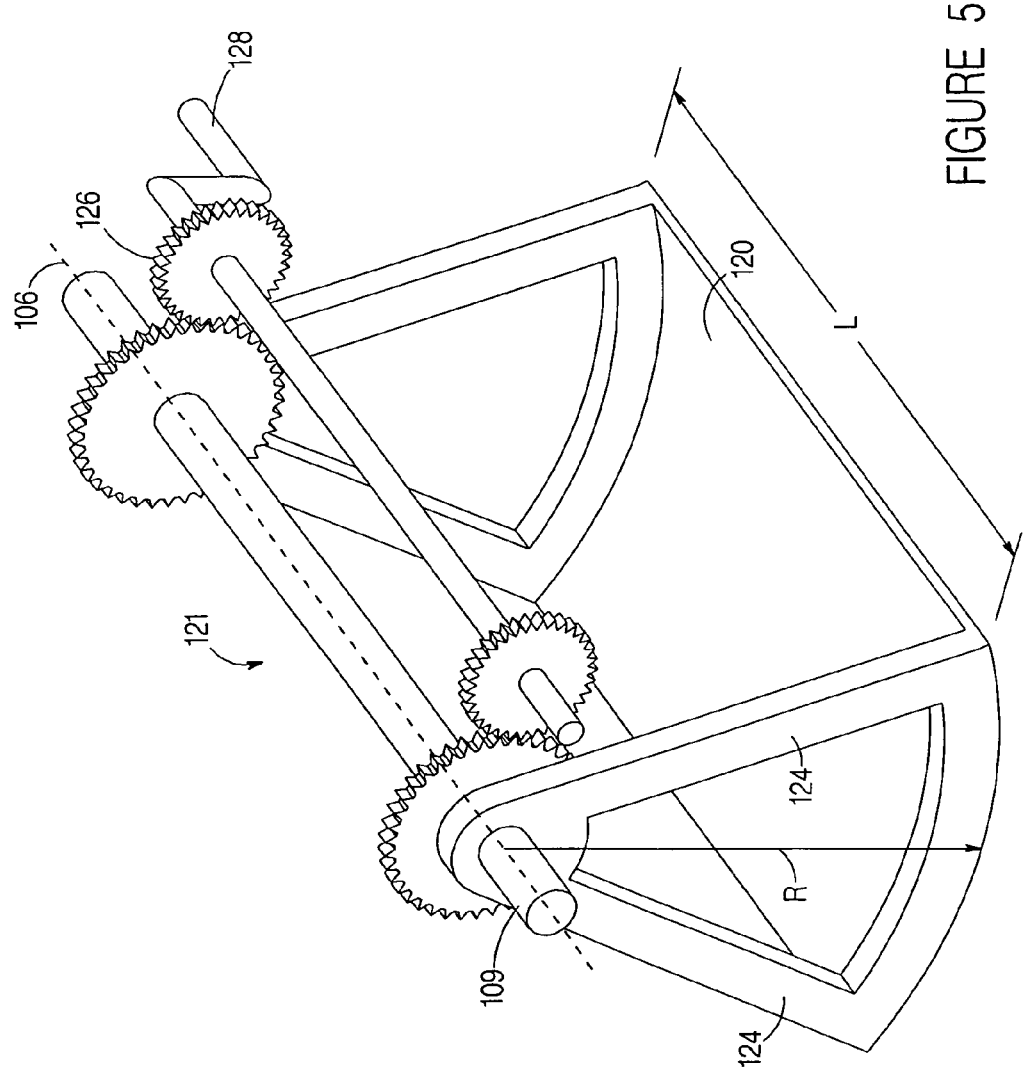

The structure, operation, and advantages of the present preferred embodiment of the invention will become further apparent upon consideration of the following description taken in conjunction with the accompanying drawings, wherein:

FIG. 1A is a schematic oblique view of a perforated cylindrical drum;

FIG. 1B is a view of the drum of FIG. 1A with a sheet of flat material being held to its perforated surface;

FIG. 2 is a schematic oblique view of a hollow perforated cylindrical drum showing the regions of the perforated surface that are blocked or unblocked to airflow;

FIG. 3 is an oblique view of the hollow perforated cylindrical drum with the knife guide removed to reveal the axially moveable circular plates;

FIG. 4 is an oblique view of the hollow perforated cylindrical drum with the knife guide in place but with the one endplate removed to reveal the axially moveable circular plates and the circumferentially moving semi-cylindrical plate; and FIG. 5 is an oblique view of the semi-cylindrical plate and its support structure that fit inside the perforated drum.

DETAILED DESCRIPTION OF THE INVENTION

A False Drum server consists primarily of a hollow perforated cylinder (drum) having a diameter substantially bigger than that of a tire building drum. The drum is rotatable about its axis. The cylindrical part of the drum is perforated (has holes) over between 50% and 80% and preferably about 66% of its cylindrical surface and the ends of the drum are sealed against airflow except as the flow of air from inside of the drum is provided by way of an air pump that removes air from the drum. Air moves into the drum through the perforated surface, because of the internally reduced pressure relative to the outside air pressure. The terms "drum" and "measuring drum" and "False Drum"

server are herein to be regarded as synonymous except as the term "drum" is specifically referred to as an element or component of a False Drum server.

FIG. 1A is an oblique schematic view of the perforated portion 104 of the cylindrical drum 102 of the False Drum server 100. A portion 104 of the overall cylindrical drum 102 is perforated. It has holes leading from the exterior of the drum to the interior thereof. The portion 104 is generally shaped like a rectangle wrapped around about ⅔ of the circumference of the cylindrical drum 102. The perforated area is sized according to the largest tires expected to be built on the machine. The perforated portion 104 is, in its own right, a cylinder concentric with the cylindrical drum 102, but having a lesser height than the cylindrical drum 102, and extending only partially around the surface of the cylindrical drum 102. Also shown in FIG. 1A is the axis 106 of the cylindrical drum 102 and one endplate 110 which covers and seals an end of the cylinder. The other end of the cylindrical drum 102 is also sealed with an endplate (not visible in this view) so as to maintain a low pressure zone inside the cylinder; that is, both ends of the cylindrical drum are sealed in an airtight way. The cylindrical drum 102 may rotate about the axis 106.

FIG. 1A further shows a region 108 which is not perforated and has an arc width W subtending an angle a with respect to the axis 106. This cylindrical segment portion of the False Drum server houses a removable knife guide plate.

During use of the False Drum server, lengths of flat elastomeric or other sheet materials such as tire innerliner can be placed (fed) onto and held onto the drum while being cut. After each given sheet of material is cut to size, it is transferred to the tire building drum (not shown). FIG. 1B shows the drum 102 of FIG. 1A with a piece of flat material 119 being held on the surface thereof, by a pressure differential between the inside of the cylinder 102 and the outside.

Those skilled in the art will be aware that the efficiency of such an arrangement in providing a suction adhering perforated surface by which to hold the flat material 119 securely could be improved if the portion of the perforated surface 104 that is not covered by the flat material 119 is somehow otherwise covered in order to block the flow of air into the drum 102. Unwanted air flow (leaks) will have the undesired effect of reducing the pressure differential that allows the sheet material 119 to be held securely in place during the cutting operation. Typically, in standard operational practice, the portion of the perforated surface 104 which is not covered by material being held to the surface is taped with masking tape or other suitable tape (not shown) to block the undesired flow of air into the drum 102 through the uncovered holes.

The present invention facilitates controlling the effective dimensions of the perimeter areas of the perforated surface. That is, the present invention varies the effective area of the perforated surface in a controlled way along its edges, so that when smaller pieces of sheet material 119 are placed on the server, holes outside the area of the material do not represent "leaks". Time can thus be saved by not having to cover those portions of the perforated surface through which air would otherwise be free to flow because they are not covered by the sheet material 119. In other words, the present invention provides methods and apparatus by which to rapidly adjust the size of that portion of the perforated area through which air can be drawn into the drum 102.

While the apparatus described in U.S. Pat. No. 4,891,082 (Broyles and Portalupi) for providing a suction adhering surface of variable size includes a variable area suction surface, it requires multiple pumps. The present invention has the benefit of using a single air pump to provide a suction adhering surface area which is thereby simpler in construction. Moreover, the present invention maintains the existing apparatus and method of providing a uniformly cylindrically flat surface. Also, it should be noted that the present invention is not per se a type of suction adhering surface, but rather is apparatus and methods by which to vary, in a controllable way, the portion or area of a perforated suction adhering surface that provides suction adherence for individual flat sheet materials having differing dimensions from one another. In a sense, the present invention could be used with an existing (prior art) drum surface, without modifying the surface per se.

The present invention includes two principal apparatus components. One of them works to vary or limit, in a controllable way, the movement of air into the drum by way of the lateral (axial) regions of the perforated area that are not covered by the sheet material 119 being held in place. The lateral regions or areas are here defined as the two separated portions of the perforated area 104 that are closest to the two endplates 110 of the cylindrical drum 102. In FIG. 1B the two regions of the perforated area 104 that lie on either side of the sheet material 119 are called herein lateral regions. The second component works to vary or limit, in a controllable way, the movement of air into the drum by way of the semi-cylindrical regions or areas of the perforated area that are not covered by the sheet material being held in place. In general, the semi-cylindrical regions or areas are defined herein as portions or areas of the perforated area 104 that extend at least part way around the cylindrical drum. For example, in FIG. 1A, the perforated area contained within the area bounded by the letters A, B, C and D is defined here as a semi-cylindrical area because it is curved in the shape of a cylindrical segment which extends part way around the perforated portion 104 of the cylindrical surface 102.

FIG. 2 is an oblique schematic view of the False Drum 102 showing the effect of the above-described two components on the size of the portion of the perforated area through which suction adhering force can be applied to a piece of sheet material 119. The two lateral perforated areas 114a, 114b are the lateral portions of the total perforated area 104 through which air cannot flow because of the presence of two circular barriers 112a,112b, to be described in detail below, inside of the drum 102. The circular barriers 1112a, 112b are essentially discs, or baffle plates, which can be moved to different positions within the drum so that there is only vacuum in the space between the two axially-separated discs. The circular plates 112a,112b have a radius of curvature ($r_e$) less than the radius of curvature ($r_i$) of the inner surface 107 of the perforated cylindrical drum.

The two-headed arrows 113 show the directions of movement of the two circular barriers (baffle plates) 112a,112b, and of the corresponding perforated lateral areas 114a,114b through which air cannot be drawn into the drum 102 due to the presence of the barriers. Also in FIG. 2 is shown semi-circumferential perforated region 123 which is blocked to airflow by the presence of plate 120, to be described in detail below, also disposed inside of the False Drum 102.

FIG. 3 is an oblique view of a False Drum Server 100 comprising an outer cylindrical drum 102 with perforations 103 over the perforated portion 104 of its surface. Inside the drum 102 are two circular barriers 112a,112b (baffle plates) that are adjustable in relation to one another along the axis 106 of the drum. The circular barriers 112a,112b are moveable in a symmetric way, i.e., towards or away from one another. The relative motions of the barriers (baffle plates) is controlled by a left-right handed screw (not shown) from the outside of the False Drum Server 100. The perimeter of each of the baffle plates 112a,112b has a seal (not shown) such that each moveable baffle plates has a substantially air-tight seal against the inside surface of the perforated cylinder 102, and so that the baffle plates can move axially within the cylinder 102 with low friction during axial movement. The movement of the baffle plates 112a,112b is preferably in equal but opposite directions, i.e., toward or away from one another, which provides a symmetric way to block the flow of air inside the drum 102 from the lateral regions or areas 114a,114b of the total perforated surface region 104 of the cylindrical drum 102. This presumes that the material holding area on the exterior of the drum is desirably symmetrical. If not, the baffle plates can certainly be individually and asymmetrically controlled with an appropriate mechanism.

Air is drawn from the cylindrical volume V between the two baffle plates 112a,112b. The air that is pumped from the volume V is removed by way of a pump and other apparatus (not shown) which communicate with the innermost regions of the drum and the volume V such as by way of a hollow axle that is concentric with and internal to shaft 109 mounted in pillow blocks 105. Air pressure differential across the perforated surface in the region of the cylindrical volume V contained between the two baffle plates 112a,112b thereby allows the creation of a suction adhering surface the lateral regions of which are adjustable. Note in FIG. 3 the open space 111 in the circumference of the cylindrical drum surface 102. FIG. 4 shows that space 111 in FIG. 3 with a cylindrical segment 116 having a cutting knife guide 117 installed. Since there is only one volume V, there need only be one pump for removing air from the volume and creating the desired pressure differential between the volume V within the cylinder and the outer surface of the cylinder.

By adjusting the axial position of the barriers 112a,112b inside of the drum 102, the width of the portion of the False Drum perforated surface 104 through which the air can be drawn can be varied to suit (e.g., match) the width required for a particular sheet component being held to the drum. That is, the width dimensions of the portion of the perforated surface 104 that is able to provide a suction adhering surface for sheet materials 119 is able to be varied according to the axial positioning of the internal baffle plates 112a,112b.

In other words, two axially slidable, baffle plates 112a,112b are placed within the interior of the drum 102. The outer diameter of the baffle plates 112a,112b is substantially equal to the inner diameter of the drum 102. The space between the baffle plates 112a,112b defines a chamber—in this case, a vacuum chamber. The baffle plates 112a,112b may be positioned along the axis 106 of the hollow cylindrical drum 102 to vary the axial extent of the vacuum chamber, and thereby control the amount of perforated surface area through which air can be drawn into the hollow cylindrical drum. Each of the axially-moveable baffle plates 112a,112b is slidably sealed against the inner surface 107 of the perforated hollow cylindrical drum 102. A mechanism is provide for moving the baffle plates toward or away from one another. For example, the baffle plates 112a,112b each have a perimeter seal made of felt or other suitable material to block the movement of air around the perimeter of each of the two moveable circular barriers or plates. The axially moveable baffle plates 112a,112b disposed inside each opposing end of the perforated hollow cylindrical drum 102 are able to be moved towards or away from each other to vary the width of a central perforated surface area through which air can be drawn to provide an outer suction adhering surface 104 on the perforated hollow cylindrical drum.

FIG. 4 shows essentially the same view of the False Drum server 100 as is shown in FIG. 3, but with the endplate 110 removed and the cylindrical segment 116, with knife guide 117 secured in place. Also shown the FIG. 4 is an apparatus 121 comprised of a metal plate 120 having the shape of a cylindrical segment and a central shaft 122 which is connected to the plate 120 by way of the struts 124.

The apparatus 121 is shown independently, and outside of (separately from) the drum 102, in FIG. 5. The apparatus 121 consists of a metal plate 120 having the shape of a cylindrical segment having a radius of curvature R about the central shaft 122. The radius of curvature R is slightly less than the radius of curvature of the inside of the perforated drum 102. The plate 120 is attached to the central shaft 122 by struts 124. The overall length of the portion of the apparatus 121 between the most separated portions of the support struts 124 is less than the length of the cylindrical drum 102.

FIG. 4 shows the apparatus 121 installed inside the drum 102 having the perforated surface area 104 with perforations 103. FIG. 4 also shows one of the barrier plate 112a inside the drum 102. Note that the circular barrier plate 112a (and also the barrier plate 112b, which is not shown) is designed to move axially along axis 106 inside the drum 102. The aforementioned seals extending outward from the perimeter on each of the two barrier plates 112a,112b can seal against unacceptable levels of airflow between the perimeters of the barrier plates 112a,112b and the inner surface 107 of the cylindrical drum 102 in the perforated region 104. The perimeter seals of the two barrier plates 112a,112b are also able to ride over the thin metal plate 120 of the apparatus 121.

FIG. 5 is an oblique view of the semi-cylindrical plate support and moving apparatus 121 that is discussed hereinabove which is, like the two axially moving circular barriers 112a,112b, disposed internally of the False Drum 102. A metal plate 120 has the shape of a cylindrical segment having a radius of curvature R from axis 106 through the central shaft 122, which is slightly less than the radius of curvature of the inner surface 107 of the perforated drum 102. The plate 120 is attached to the central shaft 122 by struts 124. The overall length L of the portion of the apparatus 121 between the most separated portions of the support struts 124 is less than the length of the interior of the drum 102.

When the plate 120 is disposed inside of the drum 102, and the plate 120 is adjacent the inner side of the perforated portion 104 of the drum 102, the movement of air into the drum from the outside is thereby impeded in that region. That is, the plate 120 blocks the flow of air into the drum 102 through the portion of the perforated area that is covered by the plate which is made of rigid, thin sheet material.

It is important to note that the plate 120 is made of thin, rigid material in order to withstand the pressure differential between the inside of the drum 102 and the outside of the drum without deflecting inward toward the center of the drum. Those who are knowledgeable of the arts of mechanical design will note that the cylindrical segmental shape of the plate 120 will contribute to the rigidity of the thin metal plate in withstanding the pressure differential.

Referring to FIG. 5, there is shown provided a mechanism 126 by which a hand crank 128 or a motor-controlled shaft can convey to the apparatus 121 supporting the plate 120 an angular motion and a fixed angular position inside of the drum 102.

It is within the scope of the invention that both controlling the lateral and semi-cylindrical size of the openings 103 into False Drum 102 limit, control or vary the dimensions of that portion of the perforated surface area 104 of the perforated drum 102 through which air can be drawn into the drum. The two circular barriers (baffle plates) 112a,112b (FIGS. 3 and 4) are intended to move axially within the region between the support struts 124 of the plate 120. The thinness of the plate 120 is such that the perimeter seals on the barrier plates 112a,112b will accommodate the plate, sealing adequately against the unwanted flow of air around the perimeters of the barriers in the immediate region where the perimeter seals meet, ride over, and slide upon the plate 120.

The circumferentially moveable, cylindrically curved plate or element 120 disposed inside the hollow cylindrical drum 102 has an axis of rotation contiguous with the axis of the hollow cylindrical drum and has a length less than the length of the cylindrical volume inside the hollow cylindrical drum, and an outermost radius of curvature about equal to the radius of curvature of the inner surface 107 of the hollow perforated cylindrical drum. The circumferentially moveable cylindrically curved element 120 has an arc width in the range of about 60 degrees to about 120 degrees, and preferably about 80 degrees to 90 degrees with respect to the axis of rotation of the cylindrically curved element.

In other words, a circumferentially moveable curved cylinder segment conforming to the inner surface 107 of the perforated cylindrical drum is located inside of the hollow drum. The amount of perforated surface area through which air can be drawn into the hollow cylindrical drum is varied by circumferentially positioning the curved cylinder segment adjacent a portion of the inner surface 107 of the hollow perforated cylindrical drum.

It may be useful to envision the perforated area as being (as mentioned above), essentially a rectangle wrapped around about 50% to 80% and preferably about 60% to 70% of the circumference of the cylinder 102. The perforated area is sized according to the largest tires expected to be built on the machine. The rectangle has a length that extends part way circumferentially around the cylinder and a width that extends across most of the axial length of the horizontally disposed cylindrical drum or False Drum server. The operation of the invention reduces or increases the "effective" width and/or length of the perforated rectangular area according to the sizes of the pieces of flat sheet material desired to be held on the surface of the False Drum server required for the size of the tire being manufactured, during the measuring out of the material, the cutting to length and holding the material till its assembly into the tire.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Apparatus for controlling the amount of perforated surface area though which air can be drawn by suction through perforations extending through a surface of a hollow cylindrical drum having an inner surface, the cylindrical drum being closed at opposite ends to prevent air flow into the drum through the opposite ends, a circumference and an axis of revolution, comprising:
    a circumferentially moveable cylindrically curved element disposed inside the hollow cylindrical drum and having an axis of rotation contiguous with the axis of the hollow cylindrical drum and having a length less than a length of a cylindrical volume inside the hollow cylindrical drum, the curved element conforming to the inner surface of the perforated cylindrical drum and having an outermost radius of curvature about equal to a radius of curvature of the inner surface of the hollow perforated cylindrical drum, whereby circumferential positioning of the curved element controls the amount of perforated surface area; and
    axially moveable baffle plates disposed inside the drum to control a width of a portion of the perforated surface between the baffle plates through which air can be drawn, each baffle plate having a radius of curvature less than the radius of curvature of the inner surface of the perforated cylindrical drum.

2. The apparatus of claim 1 characterized in that the circumferentially moveable cylindrically curved element has an arc width in the range of about 60 degrees to about 120 degrees with respect to the axis of rotation of the cylindrically curved element.

3. The apparatus of claim 2 characterized in that the circumferentially moveable cylindrically curved element has an arc width in the range of about 80 degrees to about 90 degrees with respect to the axis of rotation of the cylindrically curved element.

4. The apparatus of claim 2 characterized in that each of the axially moveable baffle plates disposed inside each opposing end of the perforated cylindrical drum has a perimeter seal made of felt or other suitable material to block the movement of air around the perimeter of each of the two moveable baffle plates.

5. The apparatus of claim 2 characterized in that:
    each of the axially moveable baffle plates disposed inside each opposing end of the perforated hollow cylindrical drum are able to be moved towards or away from each other to vary the width of a central perforated surface area through which air can be drawn to provide an outer suction adhering surface on the perforated hollow cylindrical drum.

* * * * *